United States Patent [19]

Jayne et al.

[11] 4,188,297

[45] Feb. 12, 1980

[54] LUBRICANT ADDITIVE

[75] Inventors: Gerald J. J. Jayne, Wokingham, England; David R. Woods, Kilcolgan, Ireland

[73] Assignee: Edwin Cooper and Company Limited, Bracknell, England

[21] Appl. No.: 923,816

[22] Filed: Jul. 12, 1978

[30] Foreign Application Priority Data

Jul. 22, 1977 [GB] United Kingdom ............... 30977/77

[51] Int. Cl.$^2$ ........................ C10M 1/38; C07G 17/00
[52] U.S. Cl. ..................................... 252/45; 252/406; 260/125
[58] Field of Search ................... 252/45, 406; 260/125

[56] References Cited

U.S. PATENT DOCUMENTS

| | | | |
|---|---|---|---|
| 2,691,648 | 10/1954 | Ivett | 252/45 X |
| 3,595,820 | 7/1971 | Den Herder et al. | 252/45 X |
| 4,097,474 | 6/1978 | Askew et al. | 260/125 X |

Primary Examiner—W. J. Shine
Attorney, Agent, or Firm—Donald L. Johnson; Robert A. Linn; Joseph D. Odenweller

[57] ABSTRACT

Lubricant additives having antioxidant and antiwear properties are made by reacting an oolefin such as dicyclopentadiene with sulfur and a mercaptan.

58 Claims, No Drawings

LUBRICANT ADDITIVE

BACKGROUND

Sulfurized additives are frequently used in lubricants such as crankcase oil and gear lubricants to provide antioxidant properties and extreme pressure antiwear properties. A very effective additive serving this purpose is sulfurized dicyclopentadiene as described in U.S. Pat. No. 3,882,031.

SUMMARY

According to the present invention, reactive olefinically unsaturated compounds are reacted concurrently with sulfur and a mercaptan to provide a liquid oil-soluble sulfurized additive having both antioxidant and antiwear properties in lubricant compositions.

DESCRIPTION OF THE PREFERRED EMBODIMENTS

A preferred embodiment is a lubricating oil additive which is made by the process comprising reacting at least one reactive olefinically unsaturated hydrocarbon with elemental sulfur and a mercaptan compound.

The ratio of reactants can vary widely. A good working range is about 0.5–1.5 moles of reactive olefin: 0.5–5 moles of sulfur: 0.1–2 moles of mercaptan. Greater amounts can be used and any remaining unreacted portion can either be filtered off in the case of sulfur or distilled out in the case of olefin or mercaptan.

Useful olefinically unsaturated hydrocarbons are those that react with sulfur and mercaptan under the described reaction conditions. This is readily determined by merely mixing sulfur and the olefinically unsaturated hydrocarbon in question and adding mercaptan to the mixture under the reaction conditions disclosed herein. This has been found to include a broad range of different unsaturated hydrocarbons. The more preferred are those containing about 6–30 carbon atoms and 1–3 olefinic double bonds. These include aliphatic mono- and poly-olefinically unsaturated hydrocarbons such as 1-hexene, 2-hexene, 1,3-hexadiene, 1-decene, 2-dodecene, 2-ethyl-1-hexene, 1-octadecene, 1-eicosene, 2-docosene, 1-triacontene and alloocimene and the like. These include mono- and polyolefinically unsaturated aliphatic and alicyclic hydrocarbons, terpenes and the like.

Examples of alicyclic olefinic hydrocarbons are cyclohexene, 1,4-cyclohexadiene, cycloheptene, cyclooctene, 1,5-cyclooctadiene, 1,5,9-cyclododecatriene, dicyclopentadiene, methylcyclopentadiene dimer and the like. Terpenes can be exemplified by dipentene (i.e. limonene).

Vinylbenzenes are also useful such as styrene, α-methylstyrene, 4-isobutylstyrene and the like.

When using olefins, it is not necessary to use α-olefins. Good results can be obtained with mixtures of olefins, even mixtures of different types of olefins such as a mixture of an aliphatic olefin with an alicyclic olefin.

The preferred olefinically unsaturated hydrocarbons are the dimers of cyclopentadiene and methylcyclopentadiene and mixtures thereof.

Useful mercaptan compounds include any mercapto-substituted organic compound which reacts with a mixture of sulfur and reactive olefin. One class of such mercaptan compounds are the alkylmercaptans, especially those containing about 1–20 carbon atoms. Examples of these are methylmercaptan, ethylmercaptan, isopropylmercaptan, n-propylmercaptan, isobutylmercaptan, n-butylmercaptan, tert-butylmercaptan, isohexylmercaptan, 2-ethylhexylmercaptan, 1-dodecylmercaptan, 1-octadecylmercaptan, 1-eicosylmercaptan, 2-eicosylmercaptan and the like.

Another class of mercaptans are the cycloalkyl mercaptans containing about 5–8 carbon atoms such as cyclopentylmercaptan, cyclohexylmercaptan and cyclooctylmercaptan.

Aryl and alkaryl mercaptans, especially those containing about 6–20 and 7–20 carbon atoms, respectively, can be used such as thiophenol (mercaptobenzene), thiocresol, thioxylenol, 4-dodecylthiophenol, α-naphthylmercaptan, β-naphthylmercaptan, 4-tetradecylthiophenol and the like.

Aralkyl mercaptans have been found useful. Examples of these mercaptans containing about 7–20 carbon atoms are benzylmercaptan, α-methylbenzylmercaptan, phenethylmercaptan, α,α-dimethylbenzylmercaptan, 4-tert-butylbenzylmercaptan, 2-phenyl-1-tetradecylmercaptan and the like.

Poly-mercaptans are also useful. Poly-mercapto aromatics include 1,4-dimercapto benzene, 1,2-dimercapto benzene, 1,4-dimercapto-2-methylbenzene and the like.

Likewise, alkylene dimercaptans (dimercapto alkanes) containing 2–20 carbon atoms such as 1,2-dimercaptoethane, 1,2-dimercaptopropane, 1,3-dimercaptopropane, 1,4-dimercaptobutane, 1,6-dimercaptohexane, 1,2-dimercaptodecane and the like can be used in the reaction.

Examples of other mercapto compounds are thioacetic acid, esters of thioglycolic acid, esters of thiomaleic acid and the like.

A useful product can be made by replacing a portion of the mercapto compound used in the reaction with $H_2S$. For example, up to about 75 mole percent of the mercapto compound can be replaced with $H_2S$ on an equal mole basis. Preferably, not over 50 mole percent and more preferably not over 25 mole percent of the mercapto compound is replaced with $H_2S$.

When $H_2S$ is used in conjunction with mercapto compound, it can be added before the mercapto compound, after the mercapto compound or concurrently with the mercapto compound.

Products can be made by merely mixing the olefin and sulfur and adding the mercaptan (and optionally $H_2S$) to the mixture at a temperature sufficient to cause them to react. In general, a temperature range of 0°–200° C. is adequate, more preferably 50°–200° C.

A preferred way to conduct the reaction is to mix the olefinically unsaturated hydrocarbon and sulfur and then add the mercaptan to the mixture with stirring at about 0°–175° C., more preferably, about 50°–125° C. The sulfur reacts as the mercaptan is added. This is referred to as the "first stage." The first stage product is then heated to about 125°–200° C., more preferably 135°–175° C. and reacted at that temperature in what is called the "second stage" reaction. Where any of the reactants are volatile at the reaction temperature the process may be conducted in a closed system under pressure.

The reaction between the olefinically unsaturated hydrocarbon, sulfur and mercaptan is catalyzed by addition of a sulfurization catalyst. Examples of these are tetraalkylthiuram disulfides wherein the alkyl groups contain about 1–12 carbon atoms such as methyl, ethyl, butyl, hexyl and dodecyl. Of these, the most preferred is tetramethylthiuram disulfide.

Another class of sulfurization catalysts are the amines. These include alkylamines containing about 1-20 carbon atoms such as methylamine, dimethylamine, ethylamine, isopropylamine, isobutylamine, 2-ethylhexylamine, dodecylamine, hexadecylamine, eicosylamine and the like. Likewise, cycloalkyl amines such as cyclopentylamine, cyclohexylamine, cyclooctylamine and the like can be used. Other representative amines are benzylamine, α-methylbenzylamine, aniline, phenylene diamine, α-naphthyl amine, β-naphthyl amine, ethylene diamine, diethylene triamine, triethylene tetraamine, piperazine, piperidine, N-ethyl piperazine and the like.

Of these, the preferred are the alkyl amines, especially alkyl primary amines such as n-butylamine, 1-ethylbutylamine, 1,1-diethylbutylamine, 1,1-dibutylpentylamine and the like. A highly preferred class of amines are the tert-alkyl primary amines such as Primene JM-T or 81R (registered trademark of Rohm and Haas). These are mixtures of tert-alkyl primary amines containing about 12-14 carbon atoms.

The amount of sulfurization catalyst need only be an amount which catalyzes the reaction at the desired rate. This is readily determined by experiment, but a useful range is about 0.1-10 weight percent, more preferably 0.5-5 weight percent, based on the total reaction mixture.

When a sulfurization catalyst is used it is preferred to form an initial mixture of reactive olefin, sulfur and sulfurization catalyst and add the mercaptan slowly to it at about 0°-200° C. The ensuing reaction is usually exothermic.

Although not required, the properties of the reaction product are enhanced by adding a reaction promoter to the reaction mixture prior to completion. This can be added at the start of the reaction or at an intermediate stage. A preferred method of conducting the reaction is to add the promoter after the completion of the first stage of the reaction, that is, after adding the mercaptan. The promoter is then added and the reaction completed usually, but not necessarily, by heating the reaction to a somewhat higher temperature.

The amount of promoter added is only a small amount. Good results are generally achieved using about 0.05-10 weight percent, preferably about 0.5-5 weight percent, based on the weight of the reaction mixture.

Useful promoters include the various isomer of dimercaptothiadiazole, especially 2,5-dimercapto-1,3,4-thiadiazole (DMTZ) and its derivatives, such as 2,5-bis-(alkyldithio)-1,3,4-thiadiazole or 2(alkyldithio)-5-mercapto-1,3,4-thiadiazole. In these derivatives, the preferred substituent is one containing about 4-12 carbon atoms such as butyl, hexyl, octyl, decyl or dodecyl. Preferred alkyl substituents are the branched chain alkyl such as branched octyl and dodecyl.

It is sometimes desirable, but not necessary, to conduct the reaction in two stages adding only part of the reactive olefin in the first stage. For example, about 50-75 percent of the total reactive olefin can be mixed with the sulfur and sulfurization catalyst and the mercaptan added to it at about 0°-200° C., preferably about 50°-125° C. to complete the first stage, then the remaining olefin and optionally the promoter, can be added and the mixture reacted in a second stage at 125°-200° C., preferably 135°-175° C. to complete formation of the product.

When operating in this manner it is not necessary to use the same olefin or mixture of olefins in the first and second stages. For example, cyclopentadiene dimer can be used in the first stage and alloocimene or methylcyclopentadiene dimer used in the second stage. The following examples illustrate the process of preparing the additives.

EXAMPLE 1

First Stage

In a reaction vessel was placed 132 g of dicyclopentadiene (DCPD), 64 g of sulfur, and 3 g $C_{12-14}$ tert-alkyl primary amine (Primene 81R). This mixture was heated to 100° C. and then 101 g of tert-dodecyl mercaptan added slowly to the stirred mixture.

Second Stage

To the first stage reaction product was added 79.2 g of dicyclopentadiene and 3 g of DMTZ and the stirred mixture heated to 150° C. for 90 minutes. The resulting product was vacuum stripped to yield 327.5 g of an oil soluble product analyzing 24.9 weight percent sulfur.

EXAMPLE 2

The procedure of Example 1 was repeated except 45 g of tert-butyl mercaptan was substituted for the tert-dodecyl mercaptan. The oil soluble product did not have any mercaptan odor and analyzed 30.3 weight percent sulfur.

EXAMPLE 3

In a reaction vessel was placed 132 g of dicyclopentadiene, 64 g of sulfur and 3 g of Primene 81R. This mixture was stirred at 100° C. and 45 g of tert-butyl mercaptan was added to it at 100°-110° C. The product was then heated to 150° C. and stirred at that temperature for 2 hours. After filtration and vacuum strip there remained 237 g of liquid oil-soluble product analyzing 32.6 weight percent sulfur.

EXAMPLE 4

In a reaction vessel was placed 132 g of dicyclopentadiene, 64 g of sulfur and 3 g of Primene 81R catalyst. Then 45 g of tert-butyl mercaptan was added slowly to this at about 100° C. In a second stage, 79.2 g of dicyclopentadiene and 3 g of DMTZ was added to the mixture and the reaction stirred on a rotary evaporator and filtered hot to yield 284.3 g of liquid product analyzed at 27.5 weight percent sulfur.

EXAMPLE 5

In a reaction vessel was placed 132 g of dicyclopentadiene, 48 g sulfur and 3 g Primene 81R catalyst. Then 56 ml tert-butyl mercaptan was added slowly to the mixture at 90°-100° C. Following this first stage, 3 g of DMTZ was added and the reaction heated to 150° C. and stirred for 2 hours. After vacuum strip and filtration there remained 240 g of liquid product analyzing 28.9 weight percent sulfur.

EXAMPLE 6

This reaction was conducted in the same manner as Example 5 except 112 ml of tert-butyl mercaptan was used. The yield was 255.7 g of liquid product analyzing 28.3 weight percent sulfur.

EXAMPLE 7

In a reaction vessel was placed 66 g of dicyclopentadiene, 24 g of sulfur and 1.5 g of Primene 81R. Then 19 g of n-propyl mercaptan was added to the mixture at 90° C. In a second stage 1.5 g of DMTZ was added and the mixture heated at 150° C. for 2 hours. The yield was 105.6 g of a liquid oil-soluble product analyzing 29.8 weight percent sulfur.

EXAMPLE 8

This reaction was conducted in the same manner as Example 7 except 31 g of thio-p-cresol was used instead of the n-propyl mercaptan. The reaction yielded 100 g of a liquid oil-soluble product analyzing 26.6 weight percent sulfur.

EXAMPLE 9

This reaction was conducted in the same manner as EXAMPLE 7 except 19 g of isopropyl mercaptan was used instead of n-propyl mercaptan. The yield was 107 g, analyzing 29.2 weight percent sulfur.

EXAMPLE 10

This reaction was conducted in the same manner as EXAMPLE 7 except 22.5 g of benzyl mercaptan was added instead of n-propyl mercaptan. The yield was 117 g, analyzing 25.2 weight percent sulfur.

EXAMPLE 11

This example was conducted in the same manner as EXAMPLE 7 except 22.5 g of n-butyl mercaptan was added instead of n-propyl mercaptan. The yield was 109 g, analyzing 27.7 weight percent sulfur.

EXAMPLE 12

In a reaction vessel was placed 66 g of dicyclopentadiene, 24 g of sulfur and 1.5 g of Primene 81R. Then 22.5 g of tert-butyl mercaptan was added at 90° C. Following this, the mixture was heated at 150° C. for 2 hours, vacuum stripped and filtered. No promoter was used in this reaction. The yield was 105 g of a liquid oil-soluble product analyzing 29.2 weight percent sulfur.

EXAMPLE 13

In this reaction a portion of the mercaptan was replaced with hydrogen sulfide.

In a reaction vessel was placed 66 g of DCPD, 24 g of sulfur and 1.5 g of Primene 81R. At about 100° C. 11.25 g of tert-butyl mercaptan was added to the mixture. Following this, 5.9 g of hydrogen sulfide was passed into the mixture at about 90° C. In a second stage, 16.5 g of DCPD and 1.5 g of DMTZ was added to the mixture which was heated and stirred at 150° C. for one hour. After the usual vacuum strip and filtration a liquid product was obtained containing 26.9 weight percent sulfur.

EXAMPLE 14

This preparation was similar to Example 15 except hydrogen sulfide was introduced before the mercaptan. The yield was 116 g of a liquid product analyzing 25.6 weight percent sulfur.

EXAMPLE 15

In a reaction vessel was placed 33 g of DCPD, 12 g of sulfur, and 0.75 g of Primene 81R. Then 9.5 g of 1,6-dimercaptohexane was added at 90° C. The mixture was then heated to 150° C. and stirred for 2 hours. After standard workup the liquid oil-soluble product contained 28 weight percent sulfur.

EXAMPLE 16

In a reaction vessel was placed 66 g of DCPD, 24 g of sulfur, and 1.5 g of Primene 81R. Then 50.5 g of tert-dodecyl mercaptan was added at 100° C. Following this, 1.5 g of DMTZ was added and the mixture stirred for 2 hours at 150° C. After vacuum strip and filtration the product analyzed 22.6 weight percent sulfur.

EXAMPLE 17

In a reaction vessel was placed 66 g DCPD, 24 g sulfur and 1.5 g of Primene 81R. While stirring at 90° C., 15.5 g of ethyl mercaptan was slowly added. An exothermic reaction occurred requiring cooling to retain 90° C. Following this first stage, 1.5 g of DMTZ was added and the mixture stirred at 150° C. for 2 hours. It was then filtered to give a liquid oil-soluble product.

EXAMPLE 18

In a reaction vessel was placed 66 g DCPD, 24 g of sulfur and 1.5 g of Primene 81R. While stirring at 90° C., 19 g of thioacetic acid was added. An exothermic reaction occurred. Then 1.5 g DMTZ was added and the mixture stirred at 150° C. for 2 hours. It was then filtered to give a liquid oil-soluble product.

EXAMPLE 19

In a reaction vessel was placed 68 g of alloocimene, 24 g sulfur and 1.5 g of Primene 81R. While stirring at 100° C., 22.5 g of tert-butylamine was added during which period all the sulfur reacted to give a dark mobile liquid. Following this, 1.5 g of DMTZ was added and the mixture stirred at 150° C. for 30 minutes. The product was filtered to give an oil-soluble liquid.

EXAMPLE 20

In a reaction vessel was placed 66 g methylcyclopentadiene dimer, 24 g sulfur and 1.5 g Primene 81R. While stirring at 100° C., 22.5 g of tert-butylmercaptan was slowly added. An exothermic reaction occurred. Following this, 1.5 g of DMTZ was added and the mixture stirred 30 minutes at 150° C. The product was filtered giving an oil-soluble liquid product.

EXAMPLE 21

In a reaction vessel was placed 54 g of 1,5-cyclooctadiene, 24 g sulfur and 1.5 g Primene 81R. While stirring at 100° C., 22.5 g of tert-butylmercaptan was added causing the mixture to react consuming the sulfur. Following this, 1.5 g of DMTZ was added and the mixture heated at 150° C. for 30 minutes. It was then filtered giving a clear, light, oil-soluble product.

EXAMPLE 22

In a reaction vessel was placed 68 g dipentene, 24 g sulfur and 1.5 g Primene 81R. While stirring at 100° C., 22.5 g of tert-butylmercaptan was slowly added. Following this first stage, 1.5 g of DMTZ was added and the mixture stirred 2 hours at 150° C. The product was filtered giving a clear mobile oil-soluble liquid.

EXAMPLE 23

In a reaction vessel was placed 52 g of styrene, 24 g of sulfur and 1.5 g Primene 81R. While stirring at 100°

C., 22.5 g of tert-butylmercaptan was slowly added. In a second stage, 1.5 g of DMTZ was added and the mixture stirred 2 hours at 150° C. The product was filtered giving a clear bright oil-soluble product.

EXAMPLE 24

In a reaction vessel was placed 81 g of cyclododecatriene, 24 g of sulfur and 1.5 g Primene 81R. The mixture was stirred at 100° C. while adding 22.5 g tert-butylmercaptan. Following this, 1.5 g of DMTZ was added and the mixture stirred at 150° C. for 2 hours. It was then filtered giving a clear liquid product which was not quite as oil soluble as the other products.

EXAMPLE 25

In a reaction vessel was placed 126 g octadecene-1, 24 g of sulfur and 1.5 g Primene 81R. While stirring at 100° C., 22.5 g of tert-butylmercaptan was added. A reaction occurred consuming the sulfur to give a light clear liquid intermediate. In the second stage, 1.5 g of DMTZ was added and the mixture stirred 2 hours at 150° C. The product was filtered giving a liquid oil-soluble product.

The additives are useful in lubricating oil composition. They impart both antioxidant properties and wear-inhibiting properties including extreme pressure wear-inhibiting properties.

The additives can be used in both mineral oils and synthetic oils such as olefin oligomers (e.g. hydrogenated decene-1trimer), alkylated benzenes (e.g. octadecylbenzene), synthetic esters (e.g. di-2-ethyl adipate, $C_{5-9}$ carboxylic acid esters or trimethylol propane and pentaerythritol) and the like.

In lubricating oils the additives are generally used in conjunction with other conventional additives such as neutral and overbased calcium or magnesium alkarylsulfonates, phosphosulfurized terpenes, phosphosulfurized polyisobutylene, metal (e.g. Ba, Zn) salts of steam-blown phosphosulfurized polyisobutylene, polyisobutyl succinimide of poly-ethylenepolyamines, polyisobutylphenol Mannich amine condensation products, N-alkyl phenyl naphthyl amines phenolic antioxidants such as 4,4'-methylene bis(2,6-di-tert-butylphenol) or α-dimethylamino-2,6-di-tert-butyl-p-cresol and the like. Viscosity index improves such as polyalkylmethacrylates, hydrogenated styrene isoprene copolymers, ethylene-propylene copolymers and the like are also generally blended in the oil. Likewise, zinc dialkyldithiophosphates are present in commercial engine crankcase lubricants. The present additives can be used in conjunction with such zinc additives although reduced amounts of the zinc additive will usually suffice giving a low ash oil.

In addition to crankcase lubricating oils, the additive can be used in other lubricant compositions including gear oil, transmission oil, transmission hydraulic fluids, greases and the like.

The amount of additive used should be an amount sufficient to impart the desired antioxidant and/or antiwear property. A useful range is from about 0.05–10 weight percent. A preferred range is about 0.5–3.0 weight percent.

Tests have been carried out to demonstrate the beneficial properties of the new additive. One test is referred to as the 4-ball test in which an EN-31 steel ball is rotated in loaded contact with 3 fixed similar balls. The contact is lubricated with a mineral oil containing sufficient additive to provide 0.85% sulfur from the test additive. Test criteria are the initial seizure load (ISL) at which collapse of the oil film occurs and weld point.

Results are given in the following Table 1:

Table 1

| Additive  | ISL (Kg) | Weld Pt. (Kg) |
|-----------|----------|---------------|
| None      | 65       | 135           |
| Example 2 | 60       | 380           |
| Example 5 | 75       | 400           |
| Example 7 | 80       | 390           |
| Example 8 | 85       | 390           |
| Example 9 | 80       | 380           |

A second test used was the Timken OK load test (IP 240/74). In this test, a test block bears against a rotating cap lubricated with test oil containing sufficient additive to provide 0.3% sulfur in the oil. The OK load is the maximum load in which no scoring or seizure occurs. Results obtained are given in Table 2.

Table 2

| Additive  | OK Load (lbs) |
|-----------|---------------|
| None      | 12            |
| Example 2 | 50            |
| Example 5 | 35            |
| Example 7 | 50            |
| Example 8 | 50            |
| Example 9 | 55            |

Antioxidant effectiveness was determined using the Rotary Bomb test (IP 229/73T) in which 2.0% of the test additive is dissolved in neutral mineral oil. The oil is placed in a test bomb under oxygen pressure. The bomb is rotated in a 150° C. bath. Criteria is the minutes until a 25 psig pressure drop occurs. Results are shown in the following Table 3.

Table 3

| Additive   | Min. to 25 psig drop |
|------------|----------------------|
| None       | 45                   |
| Example 1  | 155                  |
| Example 2  | 164                  |
| Example 3  | 162                  |
| Example 5  | 173                  |
| Example 6  | 180                  |
| Example 7  | 160                  |
| Example 8  | 254                  |
| Example 9  | 267                  |
| Example 10 | 101                  |
| Example 12 | 118                  |
| Example 13 | 160                  |
| Example 14 | 128                  |

Several of the additives were subjected to a 36-hour Petter W-1 engine test. In this test, lubricating oil was blended to contain one weight percent test additive in a formulated mineral oil containing other conventional additives (e.g. succinimide dispersant, overbased calcium and magnesium sulfonate, zinc dialkyldithiophosphate, etc.). Test criteria was bearing weight loss (bwl), piston appearance and undercrown rating on a 0–10 scale (10=clean). Table 4 gives the results of these tests.

Table 4

| Additive | bwl (mg) | Piston Appearance | Undercrown Rating |
|----------|----------|-------------------|-------------------|
| Ex. 2    | 31       | black patches     | 8.6               |
| Ex. 5    | 16       | clean             | 9.0               |

The additives were also subjected to a copper strip test (ASTM D 130-68, IP 154/69) to determine its corrosivity to copper. The additives were dissolved in a 150 solvent neutral mineral oil at a concentration of 1.0% and a polished copper strip immersed in the solution at 120° C. for 3 hours. The copper strips were removed from the oil, washed with isooctane and rated against ASTM Copper Strip Corrosion Standards in which 1a is untarnished and 4 is corroded. Ratings obtained are shown in Table 5.

Table 5

| Additive | Rating |
|---|---|
| Example 1 | 2e |
| Example 2 | 3a |
| Example 3 | 4a |
| Example 4 | 2e |
| Example 5 | 1b/2a |
| Example 6 | 1b |
| Example 7 | 2e |
| Example 8 | 1b |
| Example 9 | 1b |
| Example 10 | 3b |
| Example 11 | 3b |
| Example 12 | 4a |
| Example 13 | 1b |
| Example 14 | 1b |
| Example 15 | 1b |
| Example 16 | 1b |

The additives can be formulated into concentrates or packages which contain other conventional additives in proper amount such that when a dosage of the concentrate is added to lubricating oil all the required additives are added at one time.

We claim:

1. A lubricating oil additive made by the process comprising reacting about 0.5–1.5 moles of at least one reactive olefinically unsaturated hydrocarbon containing about 6–30 carbon atoms and 1–3 olefinic double bonds with about 0.5–5 moles of elemental sulfur and about 0.1–2 moles of a mercaptan compound selected from the group consisting of
   (1) alkyl mercaptan selected from methyl mercaptan, ethyl mercaptan, n-propyl mercaptan, isopropyl mercaptan, isobutyl mercaptan, n-butyl mercaptan and tert-butyl mercaptan;
   (2) cycloalkyl mercaptan containing 5–8 carbon atoms;
   (3) aryl mercaptan containing 6–20 carbon atoms;
   (4) alkaryl mercaptan containing 7–20 carbon atoms;
   (5) aralkyl mercaptan containing 7–20 carbon atoms;
   (6) polymercapto aromatic selected from 1,4-dimercaptobenzene, 1,2-dimercaptobenzene, and 1,4-dimercapto-2-methylbenzene; and
   (7) dimercaptoalkane containing 2–10 carbon atoms at a temperature of about 50°–200° C.

2. An additive of claim 1 wherein said process is conducted in the presence of a sulfurization catalyst.

3. An additive of claim 2 wherein said sulfurization catalyst is tetraalkylthiuram disulfide.

4. An additive of claim 3 wherein said tetraalkylthiuram disulfide is tetramethylthiuram disulfide.

5. An additive of claim 2 wherein said sulfurization catalyst is an amine.

6. An additive of claim 5 wherein said amine is an alkylamine.

7. An additive of claim 6 wherein said alkylamine is a tert-alkyl primary amine.

8. An additive of claim 1 wherein said olefin is a dimer of cyclopentadiene, methylcyclopentadiene or mixtures thereof.

9. An additive of claim 8 wherein said process is conducted in the presence of a sulfurization catalyst.

10. An additive of claim 9 wherein said sulfurization catalyst is a tetraalkylthiuram disulfide.

11. An additive of claim 10 wherein said tetraalkylthiuram disulfide is tetramethylthiuram disulfide.

12. An additive of claim 8 wherein said sulfurization catalyst is an amine.

13. An additive of claim 12 wherein said amine is an alkylamine.

14. An additive of claim 2 wherein said reactive olefin is a vinylbenzene.

15. An additive of claim 14 wherein said vinylbenzene is styrene.

16. An additive of claim 2 wherein said reactive olefin is alloocimene.

17. An additive of claim 2 wherein said reactive olefin is 1,5-cyclooctadiene.

18. An additive of claim 2 wherein said reactive olefin is dipentene.

19. An additive of claim 2 wherein said reactive olefin is cyclododecatriene.

20. An additive of claim 2 wherein said reactive olefin is an aliphatic olefinically unsaturated hydrocarbon.

21. An additive of claim 20 wherein said olefinically unsaturated hydrocarbon is a monoolefinically unsaturated hydrocarbon.

22. An additive of claim 21 wherein said monoolefinically unsaturated hydrocarbon is an α-olefin containing about 6–30 carbon atoms.

23. An additive of claim 22 wherein said α-olefin is 1-octadecene.

24. An additive of claim 2 wherein a small amount up to about 0.05–10 weight percent based on the weight of the reaction mixture of a promoter compound selected from the group consisting of dimercapto thiadiazole, 2,5-bis(alkyldithio)-1,3,4-thiadiazole and 2-alkyldithio-5-mercapto-1,3,4-thiadiazole is added to the reaction mixture prior to completion of the reaction.

25. An additive of claim 24 wherein said promoter is 2,5-dimercapto-1,3,4-thiadiazole.

26. An additive of claim 25 wherein said sulfurization catalyst is an amine.

27. An amine of claim 26 wherein said amine is an alkylamine.

28. An additive of claim 27 wherein said reactive olefinically unsaturated hydrocarbon is selected from the group consisting of dimers of cyclopentadiene, methylcyclopentadiene and mixtures thereof.

29. An additive of claim 28 wherein said reactive olefinically unsaturated hydrocarbon is cyclopentadiene dimer.

30. An additive of claim 29 wherein said alkylamine is a tert-alkyl primary amine.

31. A process for making a sulfurized lubricant additive, said process comprising reacting about 0.5–1.5 moles of at least one reactive olefinically unsaturated hydrocarbon containing about 6–30 carbon atoms and 1–3 olefinic double bonds with about 0.5–5 moles of elemental sulfur and about 0.1–2 moles of a mercaptan compound selected from the group consisting of
   (1) alkyl mercaptan selected from methyl mercaptan, ethyl mercaptan, n-propyl mercaptan, isopropyl mercaptan, isobutyl mercaptan, n-butyl mercaptan and tert-butyl mercaptan;

(2) cycloalkyl mercaptan containing 5–8 carbon atoms;
(3) aryl mercaptan containing 6–20 carbon atoms;
(4) alkaryl mercaptan containing 7–20 carbon atoms;
(5) aralkyl mercaptan containing 7–20 carbon atoms;
(6) polymercapto aromatic selected from 1,4-dimercaptobenzene, 1,2-dimercaptobenzene, and 1,4-dimercapto-2-methylbenzene; and
(7) dimercaptoalkane containing 2–10 carbon atoms at a temperature of about 50–200° C.

32. A process of claim 31 conducted in the presence of a sulfurization catalyst.

33. A process of claim 32 wherein said sulfurization catalyst is a tetraalkylthiuram disulfide.

34. A process of claim 33 wherein said tetraalkylthiuram disulfide is a tetramethylthiuram disulfide.

35. A process of claim 32 wherein said sulfurization catalyst is an amine.

36. A process of claim 35 wherein said amine is an alkylamine.

37. A process of claim 32 wherein said reactive olefinically unsaturated hydrocarbon is selected from the group consisting of dimers of cyclopentadiene, methylcyclopentadiene and mixtures thereof.

38. A process of claim 37 wherein said reactive olefinically unsaturated hydrocarbon is cyclopentadiene dimer.

39. A process of claim 38 wherein said mercaptan is an alkyl mercaptan selected from the group consisting of
(1) alkyl mercaptan selected from methyl mercaptan, ethyl mercaptan, n-propyl mercaptan, isopropyl mercaptan, isobutyl mercaptan, n-butyl mercaptan and tert-butyl mercaptan;
(2) cycloalkyl mercaptan containing 5–8 carbon atoms;
(3) aryl mercaptan containing 6–20 carbon atoms;
(4) alkaryl mercaptan containing 7–20 carbon atoms;
(5) aralkyl mercaptan containing 7–20 carbon atoms;
(6) polymercapto aromatic selected from 1,4-dimercaptobenzene, 1,2-dimercaptobenzene, and 1,4-dimercapto-2-methylbenzene; and
(7) dimercaptoalkane containing 2–10 carbon atoms at a temperature of about 50–200° C.

40. A process of claim 39 wherein said alkyl mercaptan is tert-butyl mercaptan.

41. A process of claim 32 wherein a small amount of from about 0.05 to 10 weight percent based on the weight of the reaction mixture of a promoter compound selected from the group consisting of dimercapto thiadiazole, 2,5-bis(alkyldithio)-1,3,4-thiadiazole and 2-alkyldithio-5-mercapto-1,3,4-thiadiazole is added to the reaction mixture prior to completion of the reaction.

42. A process of claim 41 wherein said sulfurization catalyst is an amine.

43. A process of claim 42 wherein said reactive olefinically unsaturated hydrocarbon is selected from the group consisting of dimers of cyclopentadiene and an methylcyclopentadiene and mixtures thereof.

44. A process of claim 43 wherein said reactive olefinically unsaturated hydrocarbon is cyclopentadiene dimer.

45. A process of claim 44 wherein said mercaptan is an alkyl mercaptan.

46. A lubricating composition comprising a major portion of lubricating oil and a minor amount sufficient to improve antiwear properties of an additive of claim 1.

47. A lubricating composition of claim 46 wherein said additive is the additive of claim 2.

48. A lubricating composition of claim 47 wherein said additive is the additive of claim 3.

49. A lubricating composition of claim 47 wherein said additive is the additive of claim 5.

50. A lubricating composition of claim 47 wherein said additive is the additive of claim 9.

51. A lubricating composition of claim 50 wherein said additive is the additive of claim 10.

52. A lubricating composition of claim 51 wherein said additive is the additive of claim 11.

53. A lubricating composition of claim 50 wherein said additive is the additive of claim 12.

54. A lubricating composition of claim 53 wherein said additive is the additive of claim 13.

55. A lubricating composition of claim 47 wherein said additive is the additive of claim 25.

56. A lubricating composition of claim 55 wherein said additive is the additive of claim 26.

57. A lubricating composition of claim 56 wherein said additive is the additive of claim 27.

58. A lubricating composition of claim 57 wherein said additive is the additive of claim 28.

* * * * *